(12) United States Patent
Hampton et al.

(10) Patent No.: US 9,915,362 B2
(45) Date of Patent: Mar. 13, 2018

(54) FLUIDIC DIODE CHECK VALVE

(71) Applicants: Keith Hampton, Ann Arbor, MI (US); David E. Fletcher, Flint, MI (US); Brian M. Graichen, Leonard, MI (US); James H. Miller, Ortonville, MI (US); Matthew C. Gilmer, Whitmore Lake, MI (US); Andrew D. Niedert, Farmington Hills, MI (US)

(72) Inventors: Keith Hampton, Ann Arbor, MI (US); David E. Fletcher, Flint, MI (US); Brian M. Graichen, Leonard, MI (US); James H. Miller, Ortonville, MI (US); Matthew C. Gilmer, Whitmore Lake, MI (US); Andrew D. Niedert, Farmington Hills, MI (US)

(73) Assignee: Dayco IP Holdings, LLC, Troy, MI (US)

(*) Notice: Subject to any disclaimer, the term of this patent is extended or adjusted under 35 U.S.C. 154(b) by 0 days.

(21) Appl. No.: 15/448,726

(22) Filed: Mar. 3, 2017

(65) Prior Publication Data

US 2017/0254426 A1 Sep. 7, 2017

Related U.S. Application Data

(60) Provisional application No. 62/303,076, filed on Mar. 3, 2016.

(51) Int. Cl.
*F16K 15/00* (2006.01)
*F15C 1/02* (2006.01)
*F16K 15/02* (2006.01)

(52) U.S. Cl.
CPC .................................. *F16K 15/02* (2013.01)

(58) Field of Classification Search
CPC ...... F16K 15/02; F16K 47/10; F16K 99/0021; F17D 1/16; Y10T 137/2273; Y10T 137/2224; Y10T 137/212
(Continued)

(56) References Cited

U.S. PATENT DOCUMENTS 1,329,559 A 2/1920 Tesla
3,380,465 A 4/1968 Rona
(Continued)

FOREIGN PATENT DOCUMENTS

JP   S62-251508   11/1987
WO   02/090782    11/2002

OTHER PUBLICATIONS

PCT, International Search Report and Written Opinion; Patent Application No. PCT/US2017/020648; 6 pages (dated May 23, 2017).

(Continued)

*Primary Examiner* — Minh Le
(74) *Attorney, Agent, or Firm* — FisherBroyles, LLP; Susan M. Oiler

(57) ABSTRACT

Fluidic diodes are disclosed that have a housing defining an inlet and an outlet and a divided fluid passageway therebetween defined by mirror image partitions generally tear-drop shaped spaced apart a first distance from one another by a constant width primary fluid pathway with the tip thereof pointed generally toward the outlet and spaced apart a second distance from an interior wall of the housing to define a constant width secondary fluid pathway. Fluid flow from the inlet to the outlet is through the primary fluid pathway with some additional flow through the secondary fluid pathways joining the primary fluid pathway proximate the outlet for flow together in the same direction, and fluid flow from the outlet to the inlet through the secondary fluid (Continued)

pathways exits the secondary fluid pathways into the primary fluid pathway, proximate the inlet, in a direction substantially opposite the flow in the primary fluid pathway.

16 Claims, 4 Drawing Sheets

(58) Field of Classification Search
USPC .......... 137/808, 814, 825, 833, 842, 599.01;
251/126, 127, 367; 446/224; 473/610
See application file for complete search history.

(56) References Cited

U.S. PATENT DOCUMENTS

| | | | |
|---|---|---|---|
| 3,398,759 A * | 8/1968 | Rose ................... | F15C 1/02 137/814 |
| 3,472,258 A | 10/1969 | Blosser, Jr. | |
| 3,480,030 A | 11/1969 | Bermel | |
| 3,543,781 A * | 12/1970 | Kentfield ................ | F15C 1/02 137/833 |
| 3,654,946 A | 4/1972 | Wieme | |
| 3,657,930 A * | 4/1972 | Jacobson ............ | F04B 11/0033 417/322 |
| 3,667,234 A | 6/1972 | De Lizasoain | |
| 4,052,002 A | 10/1977 | Stouffer et al. | |
| 4,151,955 A | 5/1979 | Stouffer | |
| 4,911,007 A | 3/1990 | Churchill et al. | |
| 5,265,636 A | 11/1993 | Reed | |
| 5,363,704 A | 11/1994 | Huang | |
| 5,876,187 A * | 3/1999 | Forster ................. | F04B 43/046 137/814 |
| 7,043,937 B2 * | 5/2006 | Lifson .................... | F25B 13/00 138/40 |
| 7,404,416 B2 | 7/2008 | Schultz et al. | |
| 7,481,119 B2 | 1/2009 | Yang et al. | |
| 7,753,656 B2 * | 7/2010 | Lemoff ................. | H02K 44/04 417/322 |
| 8,291,976 B2 * | 10/2012 | Schultz .................. | E21B 43/12 137/811 |
| 8,418,725 B2 | 4/2013 | Schultz et al. | |
| 8,646,483 B2 | 2/2014 | Schultz et al. | |
| 8,844,651 B2 | 9/2014 | Fripp et al. | |
| 8,863,835 B2 | 10/2014 | Schultz et al. | |
| 8,910,664 B2 * | 12/2014 | Liao ..................... | B65D 81/052 137/223 |
| 9,038,652 B1 * | 5/2015 | Henry .................... | F16K 15/20 137/223 |
| 9,169,855 B1 * | 10/2015 | Dyson ...................... | F15C 5/00 |
| 9,249,649 B2 * | 2/2016 | Fripp ..................... | E21B 34/08 |
| 9,695,654 B2 * | 7/2017 | Stephenson ............ | E21B 21/01 |
| 2004/0244854 A1 | 12/2004 | Buyalsky | |
| 2011/0102508 A1 * | 5/2011 | Kim ..................... | B41J 2/14233 347/44 |
| 2012/0167994 A1 | 7/2012 | Schultz et al. | |
| 2014/0110127 A1 | 4/2014 | Zhao | |
| 2014/0151062 A1 | 6/2014 | Stephenson et al. | |
| 2014/0307032 A1 * | 10/2014 | Xie ..................... | B41J 2/14064 347/54 |
| 2015/0021019 A1 * | 1/2015 | Veit ........................ | E21B 34/08 166/250.15 |
| 2015/0059718 A1 | 3/2015 | Claywell et al. | |
| 2015/0337878 A1 * | 11/2015 | Schlosser ................ | F42B 10/42 181/213 |
| 2016/0061385 A1 | 3/2016 | Lin et al. | |
| 2016/0281579 A1 * | 9/2016 | Suchezky ............... | F01N 13/10 |

OTHER PUBLICATIONS

"Fluidic Logic"; My Maker Blog; https://mymakerblog.wordpress.com/2013/05/28/fluidic-logic-and-3d-printing/, 3 pages (May 28, 2013).

* cited by examiner

US 9,915,362 B2

FLUIDIC DIODE CHECK VALVE

RELATED APPLICATIONS

This application claims the benefit of U.S. Provisional Application No. 62/303,076, filed Mar. 3, 2016, which is incorporated by reference herein in its entirety.

TECHNICAL FIELD

The present application relates to a fluidic diode operating as a check valve, more particularly to a fluidic diode having high flow restriction when a pressure differential is imposed across the inlet and outlet directing fluid flow from the outlet toward the inlet and having low flow restriction when the pressure differential is reversed.

BACKGROUND

There are many circumstances that require a means to limit flow in one direction while permitting easy flow of fluids in the opposite direction. One way of accomplishing this is to use a check valve. A check valve typically has a component, such as a sealing member, in the fluid flow path that is movable between an open and a closed position, where in the closed position the sealing member blocks the flow in one direction and in the open position allows flow therethrough. There is a need for a means to control the flow in this manner without the cost, complexity, and other issues associated with these traditional style check valves.

SUMMARY

Herein, fluidic diodes are disclosed that replace traditional style check valves, i.e., there is no sealing member movable between an open position and a closed position. Instead, the shape and configuration of the internal pathways through the fluidic diode operate as a check valve using just the fluid flow itself therethrough. In all aspects, the fluidic diodes herein have a housing defining an inlet and an outlet and a divided fluid passageway therebetween defined by mirror image partitions generally tear-drop shaped spaced apart a first distance from one another by a constant width primary fluid pathway with the tip thereof pointed generally toward the outlet and spaced apart a second distance from an interior wall of the housing to define a constant width secondary fluid pathway. Fluid flow from the inlet to the outlet is through the primary fluid pathway with some additional flow through the secondary fluid pathways joining the primary fluid pathway proximate the outlet for flow together in the same direction, and fluid flow from the outlet to the inlet through the secondary fluid pathways exits the secondary fluid pathways into the primary fluid pathway, proximate the inlet, in a direction substantially opposite the flow in the primary fluid pathway.

In all aspects, each of the mirror image partitions has two straight sides having a length of about 4 mm to about 6 mm connected by a primary arcuate side having a radius of about 1 to about 2. The tip of each of the mirror image partitions has a secondary arcuate side having a radius of about 0 to about 0.1.

In all aspects, the outlet is dimensionally larger than the inlet, and the dimension of the outlet to the dimension of the inlet has a ratio of about 4:1 to about 2:1, and the width of the inlet is substantially the same as the width of the constant width primary fluid pathway.

The fluidic diodes disclosed herein may operatively control fluid flow within an engine, more particularly, within a subunit of the engine, such as a fuel vapor purge system, more specifically, a fuel vapor purge ejector, or within the intake manifold of the engine, more specifically to increase engine volumetric efficiency, or any system or subsystem that has periodic flow. The fluidic diodes in the engine system may have any and all of the features described herein.

BRIEF DESCRIPTION OF THE DRAWINGS

The claimed subject matter is described with reference to the accompanying drawings. A brief description of each figure is provided below. Elements with the same reference number in each figure indicate identical or functionally similar elements.

DETAILED DESCRIPTION

Figure 1:
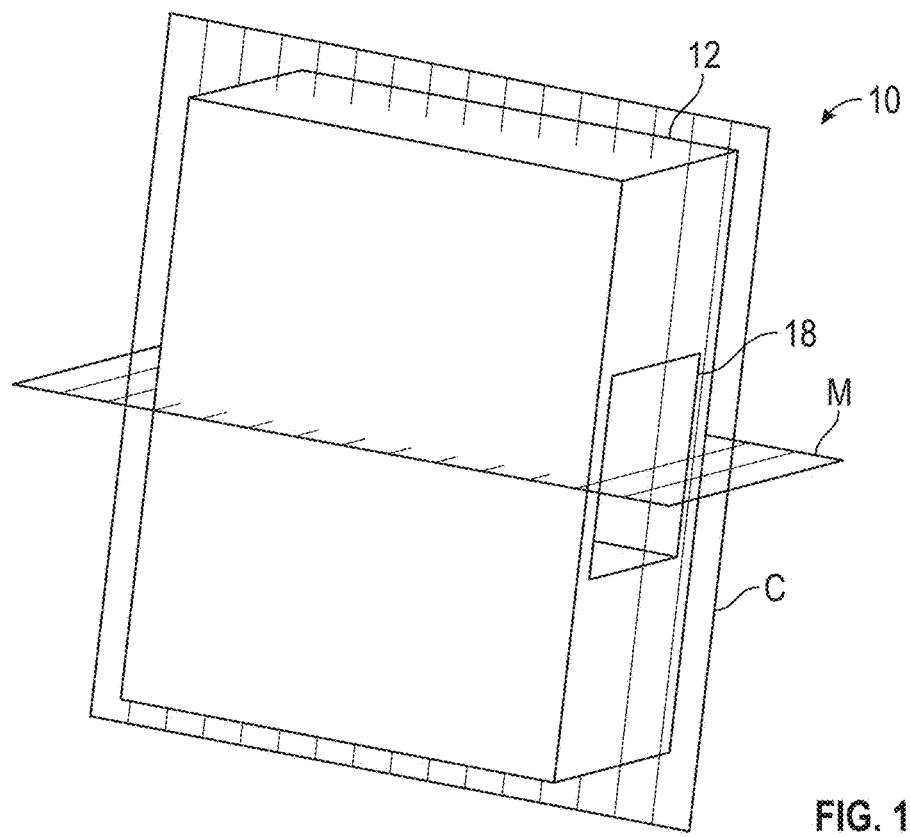
FIG. 1 is a perspective view of one embodiment of a fluidic diode.

The following detailed description will illustrate the general principles of the invention, examples of which are additionally illustrated in the accompanying drawings. In the drawings, like reference numbers indicate identical or functionally similar elements.

Figure 2:
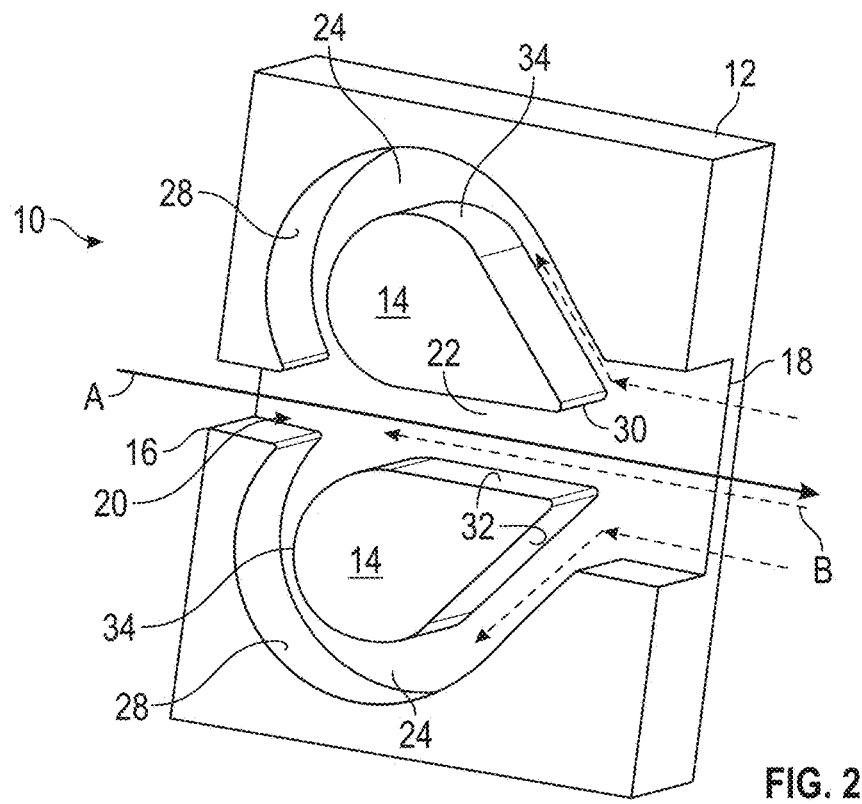
FIG. 2 is a cross-sectional view along the coronal plane of the fluidic diode of FIG. 1 transverse to the midsagittal plane aligned with the primary fluid pathway.

FIGS. 1 and 2 illustrate a fluidic diode 10 that functions as a check valve, without a moving sealing member, by effectively using the fluid flow itself to stop or significantly reduce flow in an undesired direction B (from outlet 18 to inlet 16), while allowing flow in the desired direction A (from inlet 16 to outlet 18). As shown in FIG. 1, the fluidic diode 10 has a midsagittal plane M and a coronal plane C. The midsagittal plane M is aligned with a central longitudinal axis of a primary fluid pathway 22, and the coronal plane C is transverse to the midsagittal plane M. The fluidic diode 10 has housing 12 with an inlet 16 and an outlet 18 connected for fluid communication therebetween by a divided fluid passageway 20 formed within the housing.

Referring now to FIG. 2, the divided fluid passageway 20 is defined by mirror image partitions 14 each positioned a spaced apart distance from one another by a constant width primary fluid pathway 22 and positioned a spaced apart distance from an interior wall 28 of the housing that defines a constant width secondary fluid pathway 24 between each partition 14 and the interior wall 28 of the housing. Each mirror image partition 14 has a generally tear-drop shaped coronal plane cross-section with its tip 30 pointed generally toward the outlet 18. The partitions 14 each have two generally straight sides 32 extending from the tip 30 that each have a length of about 4 mm to about 6 mm, which are connected to one another by a primary arcuate side 34 having a radius of about 1 to about 2. The tip 30 of each partition may be a second arcuate side having a radius of about 0 to about 0.1.

For exemplary purposes, the numerical values and ranges below are for a fluidic diode as part of, and operatively controlling fluid flow in, a fuel vapor purge system. The inlet 16 and the outlet 18 are of different dimensions, preferably with the outlet being dimensionally larger than the inlet as illustrated in FIG. 2. The dimensions of the outlet compared to the dimensions of the inlet are typically selected to be within a ratio of about 4:1 to about 1.5:1. When the pressure drop across the fluidic device from the inlet to the outlet is in a range of about 2 kPa to about 10 kPa, the ratio of the outlet's dimensions to the inlet's dimensions is about 1.8:1 to about 3.4:1, more preferably about 1.9:1 to about 2.5:1, and even more preferably about 2:1 to about 2.2:1. In one instance, the dimension used for determining the ratios is the width of the inlet $W_1$ and the width $W_0$ of the outlet, or it may be the area defined by the inlet and the area defined by the outlet.

Figure 4:
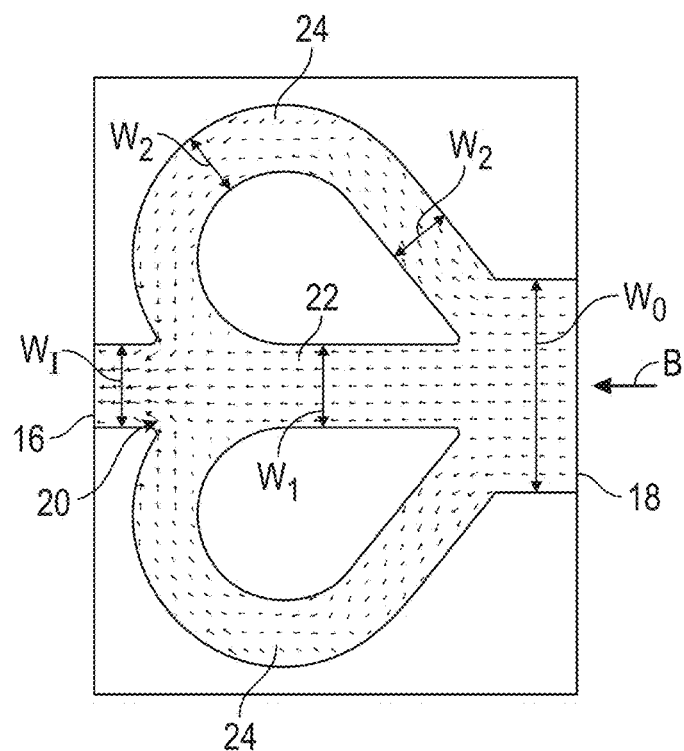
FIG. 4 is a flow diagram of fluid flow from the outlet to the inlet.

In another aspect, the width $W_1$ of the inlet 16 is substantially the same as the width $W_1$ of the constant width primary fluid pathway 22, and, as indicated by the arrows $W_2$ and $W_1$ in FIG. 4, the width $W_1$ of the primary fluid pathway 22 is substantially the same as the width $W_2$ of the secondary fluid pathways 24. Substantially the same as used herein, with respect to width(s), means that the widths are within 1% to 3% of each other. In another aspect, the width $W_1$ of the inlet 16 is less than the width $W_1$ of the constant width primary fluid pathway 22. Less than as used herein, with respect to the width, means that the width $W_1$ is about 70% to about 90% of the width of $W_1$. When the pressure drop across the fluidic device from the inlet to the outlet is in a range of about 2 kPa to about 10 kPa, the ratio of the width $W_1$ to the width $W_1$ is about 1:2.4 to about 1:1.5, more preferably about 1:1.9 to about 1:1.5, and even more preferably about 1:1.75 to about 1:6.

Figure 5:
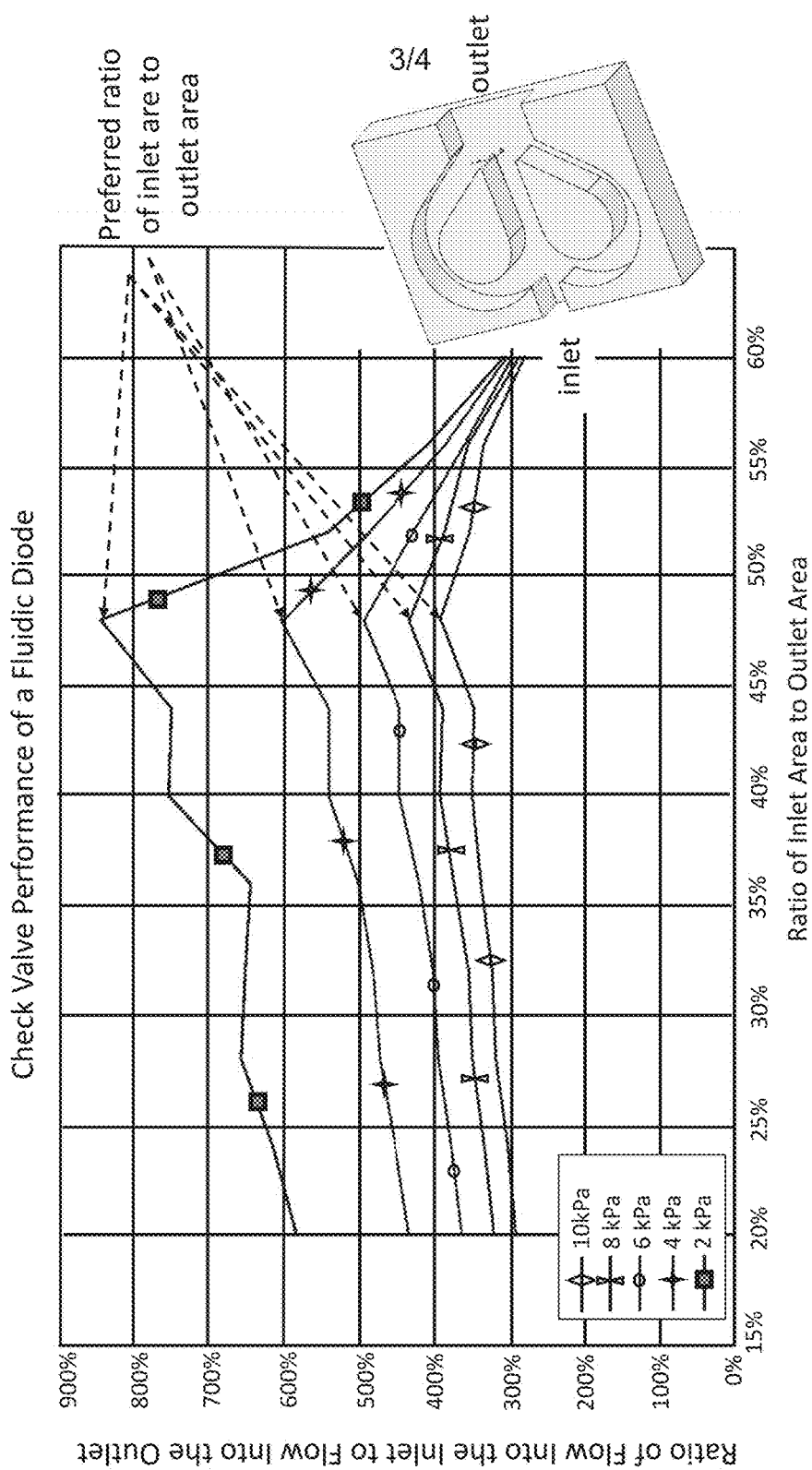
FIG. 5 is a graph of check valve performance of the fluidic diode when different differential pressure drops occur across the fluidic diode.

Turning to FIG. 5, the ratio of flow into the inlet (direction A) to flow into the outlet (direction B) is plotted versus the ratio of the inlet area to the outlet area of the fluidic diode for different delta pressures to demonstrate the check valve performance thereof. For each pressure drop, 2 kPa, 4 kPa, 6 kPa, 8 kPa, and 10 kPa, there is a peak ratio of the inlet area to outlet area, shown as approximately 48%. In other words, the area dimension of the inlet should be 48% of the size of the area dimension of the outlet. For example, if the outlet is rectangular (2 mm by 5 mm) with an area of 10 mm², then the area of the inlet is preferably 4.8 mm².

Figure 3:
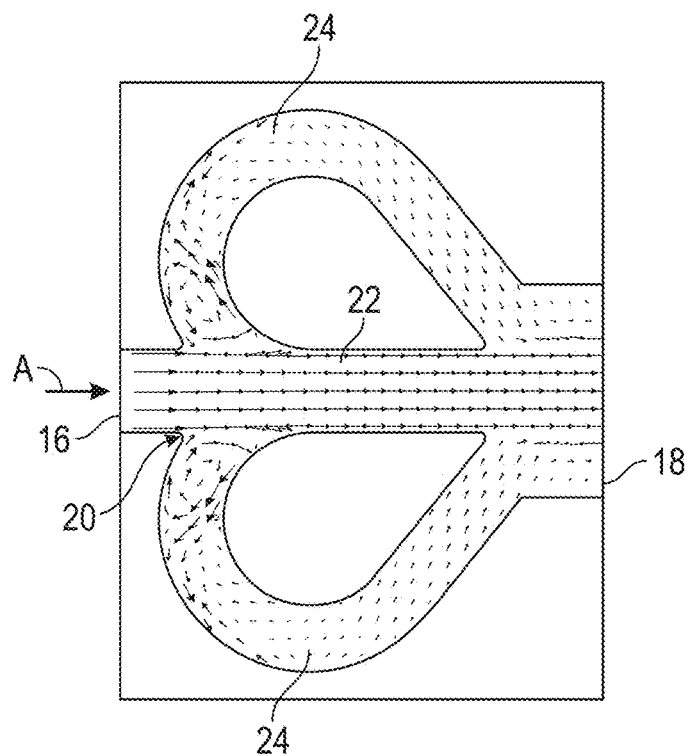
FIG. 3 is a flow diagram of fluid flow from the inlet to the outlet.
Figure 6:
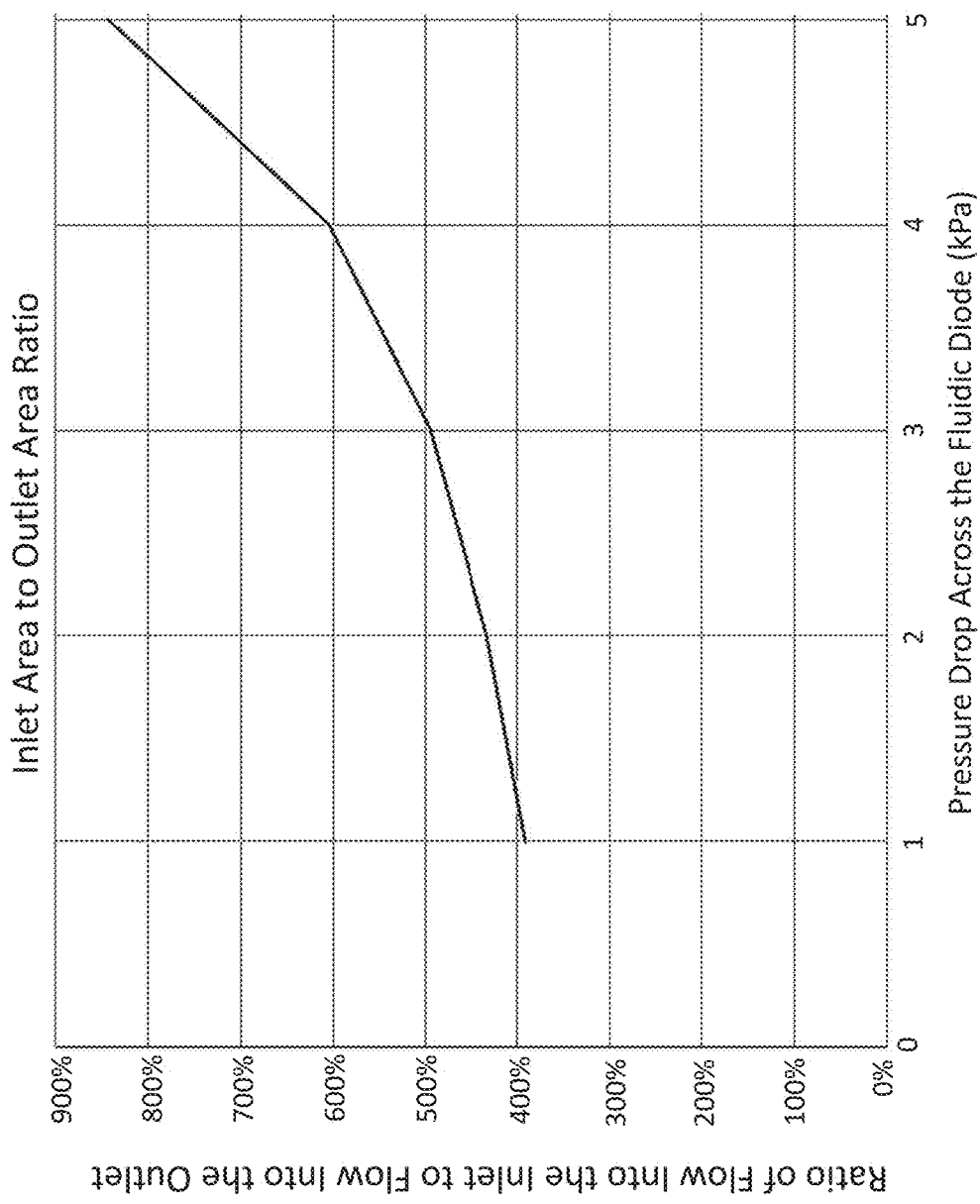
FIG. 6 is a graph demonstrating that increasing the pressure drop across the fluidic diode causes an increase in the ratio of flow into the inlet to flow into the outlet side.

FIG. 6 is a graph demonstrating that increasing the pressure drop across the diode causes an increase in the ratio of flow into the inlet to flow into the outlet side. In operation, the fluidic diode 10 has high flow restriction in the undesired direction B which flow tries to occur when a pressure differential is imposed that would direct flow in the undesired direction. The term high flow restriction can be quantified by the ratio of the flow A (FIG. 3) to the flow B (FIG. 4), where high flow restriction is present if the ratio of A/B is greater than two. The construction of the fluidic diode 10 provides this effect by allowing fluid flowing in the outlet to flow through the secondary fluid pathways 24 as well as the primary fluid pathway 22 in the same direction, but the flow through the secondary fluid pathways 24 exits into the primary fluid pathway 22, proximate the inlet 16, but directed substantially in the opposite flow direction as the flow in the primary fluid pathway. The high flow restriction is demonstrated in a flow diagram in FIG. 4.

The fluidic diode 10 has low flow restriction in the desired direction A (i.e., high flow through occurs) based on an appropriate pressure differential imposed relative to the inlet 16 and the outlet 18. The low flow restriction is demonstrated in a flow diagram in FIG. 3. In comparing FIGS. 3 and 4, the length of the arrows is proportional to the flow speed of the fluid through the fluidic diode 10. The construction of the fluidic diode 10 provides low flow restriction for the desired direction A by allowing fluid flowing in at the inlet 16 to flow through the primary fluid pathway 22 directly toward the outlet 18 with no impedance to the flow; moreover, some additional flow through the secondary fluid pathways 24 joins the primary fluid pathway 22 proximate the outlet 18 for flow together in the same direction.

While the dimension and numerical values given above are for a fuel vapor purge ejector system, other geometries, i.e., larger and smaller geometries, with similar ratios of sizes (widths and/or areas) would still be effective in checking flow. For example, a large fluidic diode of the shape disclosed herein could be mounted in an engine manifold, in either or both of the intake or exhaust manifolds, to increase engine volumetric efficiency or in the crankcase ventilation system of an engine, such as in the positions disclosed in U.S. application Ser. No. 14/015,456. The fluidic diodes disclosed herein could be added to any system or subsystem that has periodic flows, such as a mechanical supercharger, air pumps or air compressors for positive crankcase ventilation, canister purge, pneumatic brakes, etc.

The embodiments of this invention shown in the drawings and described above are exemplary of numerous embodiments that may be made within the scope of the appended claims. It is contemplated that numerous other configurations of the fluidic diode may be created taking advantage of the disclosed approach. In short, it is the Applicants' intention that the scope of the patent issuing herefrom be limited only by the scope of the appended claims.

What is claimed is:

1. A fluidic diode comprising:
   a housing having an inlet and an outlet and a divided fluid passageway formed therein, wherein the divided fluid passageway is defined by mirror image partitions positioned a first spaced apart distance from one another by a constant width primary fluid pathway and positioned a second spaced apart distance from an interior wall of the housing that defines a constant width secondary fluid pathway between each partition and the interior wall;
   wherein each of the mirror image partitions is generally tear-drop shaped when viewed as a coronal plane cross-section with a tip pointed generally toward the outlet;
   wherein flow from the inlet to the outlet is through the primary fluid pathway with some additional flow through the secondary fluid pathways joining the primary fluid pathway proximate the outlet for flow together in the same direction; and
   wherein flow from the outlet to the inlet through the secondary fluid pathways exits the secondary fluid pathways into the primary fluid pathway, proximate the inlet, in a direction substantially opposite the flow in the primary fluid pathway.

2. The fluidic diode of claim 1, wherein each of the mirror image partitions has two straight sides having a length of about 4 mm to about 6 mm connected by a primary arcuate side having a radius of about 1 to about 2.

3. The fluidic diode of claim 2, wherein the tip of each of the mirror image partitions comprises a secondary arcuate side having a radius of about 0 to about 0.1.

4. The fluidic diode of claim 1, wherein the outlet is dimensionally larger than the inlet.

5. The fluidic diode of claim 4, wherein the dimension of the outlet to the dimension of the inlet has a ratio of about 4:1 to about 2:1.

6. The fluidic diode of claim 4, wherein the width of the inlet is substantially the same as the width of the constant width primary fluid pathway.

7. The fluidic diode of claim 6, wherein the dimension of the outlet to the dimension of the inlet has a ratio of about 4:1 to about 2:1.

8. An engine system, comprising a fluidic diode according to claim 1.

9. The engine system of claim 8, wherein each of the mirror image partitions has two straight sides having a length of about 4 mm to about 6 mm connected by a primary arcuate side having a radius of about 1 to about 2.

10. The engine system of claim 9, wherein the tip of each of the mirror image partitions comprises a secondary arcuate side having a radius of about 0 to about 0.1.

11. The engine system of claim 8, wherein the outlet is dimensionally larger than the inlet.

12. The engine system of claim 11, wherein the fluidic diode operatively controls fluid flow in a fuel vapor purge system.

13. The engine system of claim 12, wherein the dimension of the outlet to the dimension of the inlet has a ratio of about 4:1 to about 2:1.

14. The engine system of claim 12, wherein the width of the inlet is substantially the same as the width of the constant width primary fluid pathway.

15. The engine system of claim 14, wherein the dimension of the outlet to the dimension of the inlet has a ratio of about 4:1 to about 2:1.

16. The engine system of claim 8, wherein the fluidic diode operatively controls fluid flow of an engine manifold, a crankcase ventilation system, a supercharger, an air pump in a positive crankcase ventilation system, an air compressor in a positive crankcase ventilation system, a canister purge system, or a pneumatic brake system.

* * * * *